(No Model.) 2 Sheets—Sheet 2.
H. COKER.
GRAIN CONVEYER.
No. 265,020. Patented Sept. 26, 1882.
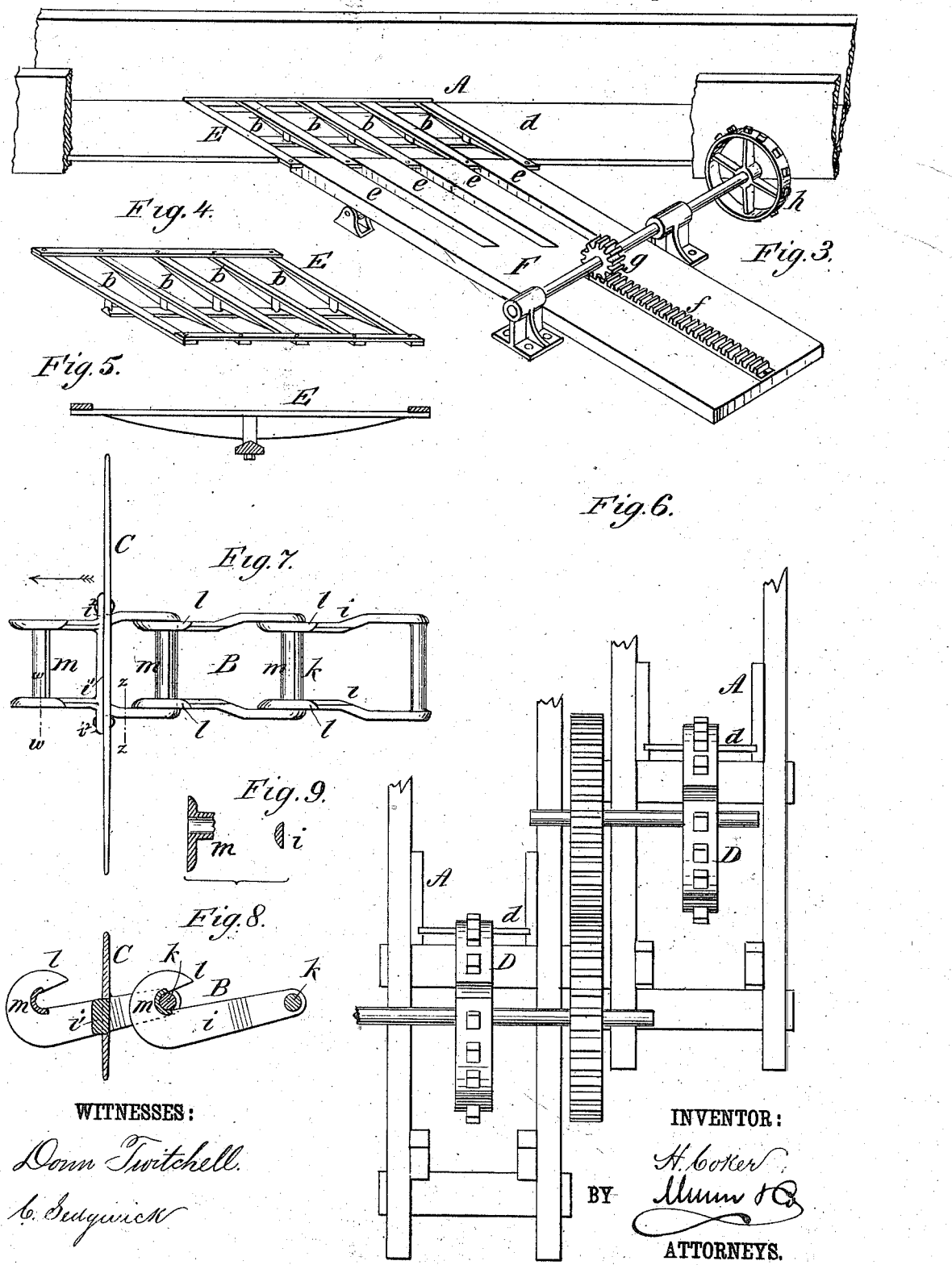
WITNESSES:
Donn Twitchell.
C. Sedgwick
INVENTOR:
H. Coker
BY Munn & Co
ATTORNEYS.

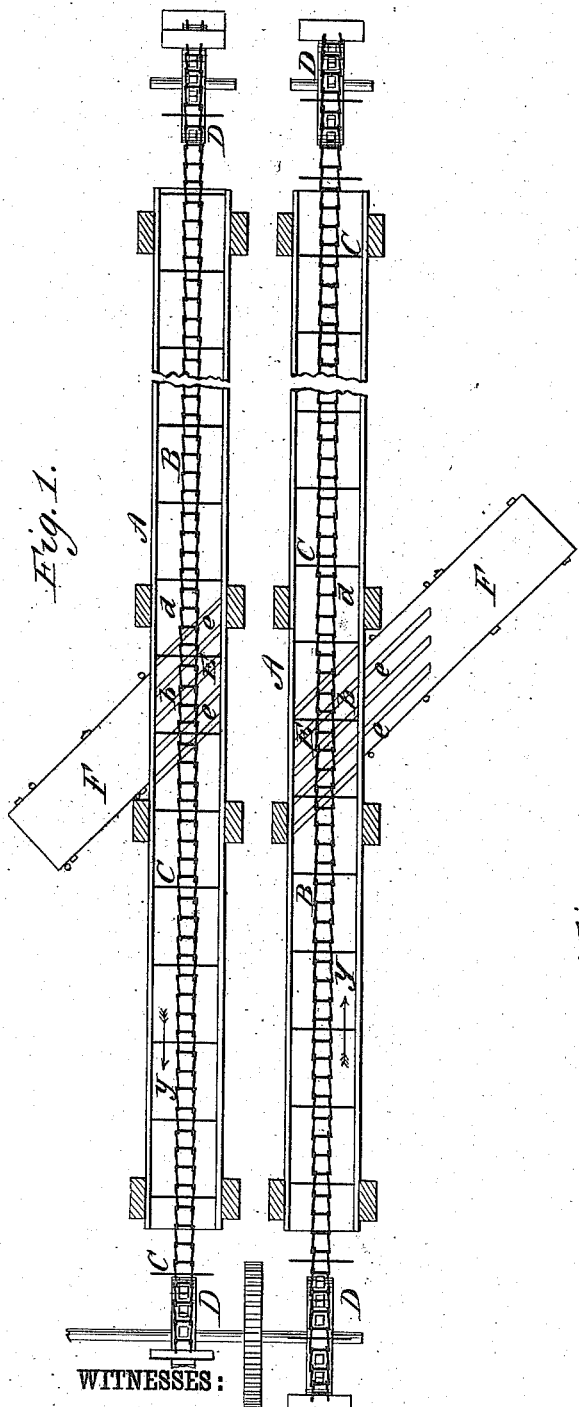
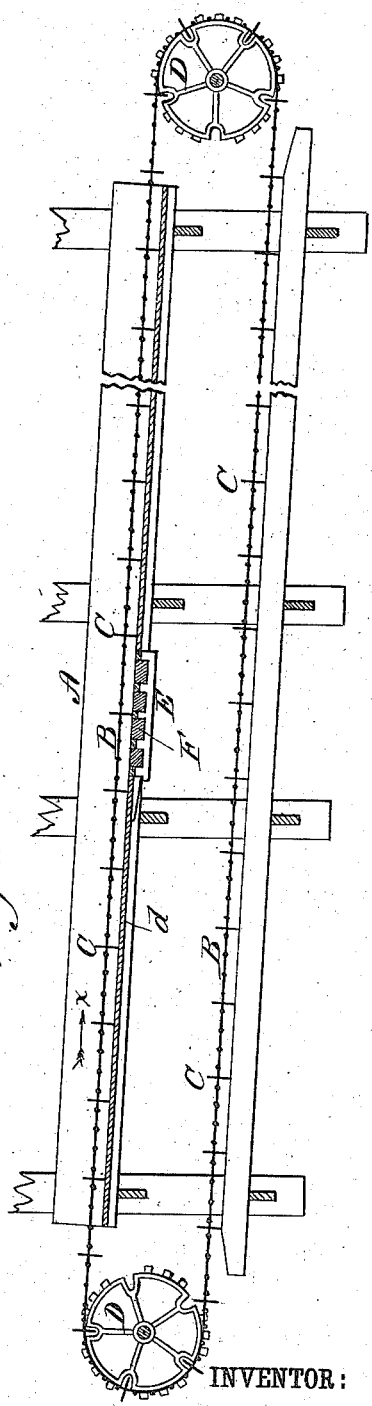

UNITED STATES PATENT OFFICE.

HENRY COKER, OF INDIANAPOLIS, INDIANA.

GRAIN-CONVEYER.

SPECIFICATION forming part of Letters Patent No. 265,020, dated September 26, 1882.

Application filed June 7, 1882. (No model.)

*To all whom it may concern:*

Be it known that I, HENRY COKER, of Indianapolis, in the county of Marion and State of Indiana, have invented a new and useful Improvement in Grain-Conveyers, of which the following is a full, clear, and exact description.

This invention relates to conveyers used in buildings for storing grain, for conveying grain in bulk or large quantities from one part of the building to another. The conveyers in ordinary use in elevators for this purpose are of three kinds—namely, the drag-belt conveyer, the worm or screw conveyer, and the flight-conveyer, all of which as heretofore constructed are more or less defective, especially in their liability to mix the various grades and colors of any one kind of grain, and in mixing different kinds of grain together. Particularly is this the case with the screw or worm conveyer, and whenever occurring it is a serious source of hinderance, annoyance, and not infrequently great financial loss. My invention, which relates to the "flight" type of conveyer, not only removes this difficulty, but possesses other advantages, including increased durability and effectiveness, together with diminution of friction; and it consists in a novel construction of parts whereby a more perfect dump-hole than is usual with other trough and flight conveyers is obtained, the flights move with more perfect freedom through the trough and are prevented from carrying grain over the dump-hole or its edges, and the links of the chain by which the flights are carried and moved are prevented from holding grain while passing over the dump-hole.

Reference is to be had to the accompanying drawings, forming part of this specification, in which similar letters of reference indicate corresponding parts in all the figures.

Figure 1 represents a plan of two trough and flight conveyers constructed in accordance with my invention, and as arranged side by side for extension from one end of the house to the other, the flights which travel through the one trough moving in a reverse direction to that of the flights in the adjacent trough, and both troughs slightly inclining downward in the directions in which their respective flights travel; but this particular arrangement of the troughs and dip of them forms no part of this invention, and the same may be changed to suit circumstances. Fig. 2 is a vertical longitudinal section through one of the troughs. Fig. 3 is a perspective view in part, mainly in illustration of a frame applied to the dump-hole of either trough, and of a gate for opening and closing said dump-hole and devices for operating said gate. Fig. 4 is a view in perspective of the dump-hole frame, and Fig. 5 a transverse section of said frame. Fig. 6 is an end elevation, in part, of the two conveyers; and Figs. 7 and 8, a plan and longitudinal section, respectively, of a portion of the chain used in each conveyer, with a flight attached; and Fig. 9, transverse sections through the links of the chain on the lines $w\ w$ and $z\ z$ in Fig. 7.

In the drawings, A A indicate two conveyer boxes or troughs, each of which, when the construction of the house or building will admit of it, may be made to grade downward in the direction in which the grain is required to move, for the purpose of more easily conveying the grain, as shown in Fig. 2, the arrow $x$ indicating the direction in motion of the flights through one of the troughs and the arrows $y\ y$ in Fig. 1 indicating that the motions of the flights through the two troughs are in reverse directions. These troughs extend from end to end of the house. In some cases the usual weigh-hoppers connected with the elevator would be arranged to spout into them, while in others the elevator-buckets would discharge into them from the head of the elevator. When said conveying-troughs are arranged side by side a sufficient space should be left between them for the usual weigh-hopper turn-head to spout into either; but, if preferred, said troughs may be arranged one above the other. The side-by-side arrangement of the troughs, inclining in reverse directions, is applicable when there is room enough between the usual hopper turn-head and the under turn-head that leads to the shipping and binning spouts to admit of the same. In such arrangement the downgrades of the troughs in the directions in which their respective flights move through them facilitate the transfer of the grain, save power, and reduce wear and tear. Gates are provided at any point along either trough for the discharge of the grain into any part of the house at the will of the weigh-master. These gates and the parts containing the dump hole or holes which they serve to control are of peculiar construction, as will be hereinafter described.

B B are the endless chains, to every fourth or more or less distant link of which the flights C C that carry the grain along the troughs are attached, said chains passing at the ends of the conveyers around wheels D D, suitably constructed to receive the links of the chains and their attached flights within them. Motion may be communicated to said chains in the ordinary or any suitable manner.

The dump-opening for the discharge of grain from either trough A is formed by a grate-like frame, E, composed of a series of longitudinal and transverse bars having apertures $b\ b$ in between them, and arranged so that the upper surface of said frame, within either trough, is flush with the bottom $d$ of the trough, and the discharge-apertures $b\ b$ occupy a diagonal or oblique position across the trough, and when not closed by the gate F present a sufficient area for the free discharge of the grain through them, notwithstanding that the grain is conveyed through the trough in large quantities and at a high rate of speed. Said frame E may be planed on its upper surface to make it line even with the bottom $d$ of the trough, and its cross-bars also be planed on their sides to provide for a perfect and parallel fit of prongs $e\ e$ of the gate F in between them, which prongs, accordingly as the gate is slid in or out in direction of the prongs, open or close the discharge-apertures $b\ b$.

Either gate F may be made of hard wood clamped together by bolts, and with its prongs or tongues $e\ e$ made to form a close but free fit between the cross-bars of the frame E, which may be of metal. When closed said tongues $e\ e$ are flush with the upper surfaces of the cross-bars of said frame E and with the bottom $d$ of the trough. Said gate F may be opened and closed—that is, its tongued portion slid in or out of the trough diagonally—by means of a rack, $f$, pinion $g$, and sprocket-wheel $h$, actuated by a pendent chain.

By the diagonal position of the dump-holes or apertures $b\ b$ relatively to the length of the troughs the flights C C, when traveling through the troughs, are restrained from catching against the edges of or falling into said holes, which would break them, and which they would be sure to do if said holes ran straight across the troughs.

The bottom $d$ of either trough, excepting where it is intercepted by the grate-like frame E, is made of a cast plate or plates of glass, which, from its smoothness, prevents undue friction, and by its hardness resists wear, thereby not merely adding to the durability of the trough, but doing away with that unevenness of wear which takes place when the bottom is made of wood and causes gutters or furrows to be cut in it, which gutters in time become pockets, that collect the grain and lead to the mixing of it, and to remove such gutters by planing the bottom from time to time is a serious interruption. Even if the bottoms of the troughs be made of the hardest wood, the grit and grain passing over them will not fail to cut or groove them, whereas when said bottoms are made of glass or other vitreous material their durability is permanent, so far as wear is concerned, a great saving of power is effected by the diminution of friction in the grain and flights passing over them, and mixing of the grain is prevented.

The flights C C, which may be of malleable iron, are of flat plate-like construction, slightly diminishing in thickness from their centers, and of the same width, or nearly so, as the trough in which they travel.

Either chain B is composed of a series of open oblong links having sides $i\ i$, united at their one end by a "cross-round," $k$, and terminating at their opposite end in hooks $l\ l$, connected by a half or partial rounded cross-socket, $m$, within which and the hooks $l\ l$ the cross-round $k$ of the adjacent link lies to form the connection between the links, certain of which have the flights arranged on them by the passage of a link through each flight, and so that it projects alike on opposite sides of the flight. This construction of the links, which are rounded on their sides and have knife-edges, as shown in Fig. 9, leaves no room for grain to lodge on them while passing over the dump-hole, thereby aiding in doing away with the mixing of the grain, and the trough is swept by the flights perfectly clean as soon as the supply of grain is cut off. The dump-apertures $b\ b$ being oblique to the line of motion of the flights over them, said flights will gradually but surely pass all the grain in front of them through said apertures, and none will be carried over to occasion "mixing," as hereinbefore referred to.

Although preferred, it is not absolutely necessary that the dumping-apertures $b$ should be oblique throughout their whole lengths to the motion of the flights; or they might be reversely oblique, forming V-shaped openings; but in either case they will still retain their oblique character.

The links of the chains, it will be observed, have their greatest strength at their jaw or hook-ends, and are of proportionate strength throughout, and their construction, including their knife-edge formations on both sides, prevents the lodgment of the smallest grain while passing over the dump-hole. The construction and shape of the flights also contribute to give like security and strength, no pockets being left for the lodgment of grain, but the flights making a close fit over the links by constructing the flights with holes in them to receive the links through their centers and riveting them to projecting ears $i^2$ of a cross-bar, $i'$, which unites the opposite sides of the links to which the flights are attached, as shown in Figs. 7 and 8, and closes or fills the holes in the flights, through which the ends and cross-bars $k$ of the said links are passed. It will also be noticed that the links are shaped to engage with one another, so that they will not become detached either when moving in a straight line or when passing round the wheels at the ends of the chains, in which are gaps for the reception of the flights.

Having thus fully described my invention, I claim as new and desire to secure by Letters Patent—

1. In a trough and flight conveyer for conveying grain, the trough provided with a series of dumping-apertures arranged diagonally or oblique to said trough and to the line of motion of the flights passing therethrough, substantially as specified.

2. The combination, with the trough, of the grate-like frame E, having its apertures $b$, which form a dumping-hole, arranged obliquely across the bottom of the trough, and the gate F, having tongues $e$, arranged to fit within and to open and close said apertures, essentially as and for the purposes herein set forth.

3. The combination, with the belt B, provided with the flights C, of the conveyer A, having its bottom $d$ constructed of glass, substantially as described, and for the purpose set forth.

4. In grain-conveyers, the flights C, apertured for passage over the end of the link, in combination with the flight-links having cross-bar $i'$, constructed to cover or fill the aperture of the flight when fastened to the link, substantially as shown and described.

5. The conveyer-chain B, composed of a series of open links having rounded and knife-edged sides $i\ i$, connected at their one end by cross-rounds $k$ and terminating at their opposite end in hooks $l$, connected by a partial cross-socket, $m$, substantially as shown and described.

HENRY COKER.

Witnesses:
HENRY C. WILSON,
CHAS. LAWRENCE.